US007664823B1

(12) United States Patent
Wakerly

(10) Patent No.: US 7,664,823 B1
(45) Date of Patent: Feb. 16, 2010

(54) PARTITIONED PACKET PROCESSING IN A MULTIPROCESSOR ENVIRONMENT

(75) Inventor: John F. Wakerly, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1239 days.

(21) Appl. No.: 10/669,624

(22) Filed: Sep. 24, 2003

(51) Int. Cl.
*G06F 15/16* (2006.01)
*G06F 15/167* (2006.01)
*G06F 7/38* (2006.01)
*G06F 9/00* (2006.01)
*G06F 9/44* (2006.01)

(52) U.S. Cl. .................. 709/211; 709/212; 712/228
(58) Field of Classification Search ......... 709/217–219, 709/238–248, 211, 212; 712/228, 718
See application file for complete search history.

(56) References Cited

U.S. PATENT DOCUMENTS

| | | | | |
|---|---|---|---|---|
| 5,228,136 A * | 7/1993 | Shimizu et al. | ............. | 711/141 |
| 5,553,241 A * | 9/1996 | Shirakihara | ................. | 709/227 |
| 6,047,122 A * | 4/2000 | Spiller | ........................ | 718/108 |
| 6,247,109 B1 * | 6/2001 | Kleinsorge et al. | ............ | 712/13 |
| 6,279,046 B1 * | 8/2001 | Armstrong et al. | ............. | 710/5 |
| 6,314,501 B1 * | 11/2001 | Gulick et al. | ................ | 711/153 |
| 6,560,629 B1 * | 5/2003 | Harris | ........................ | 718/105 |
| 6,598,063 B1 * | 7/2003 | Tang et al. | .................... | 708/606 |
| 6,606,704 B1 * | 8/2003 | Adiletta et al. | .............. | 712/248 |
| 6,684,395 B2 * | 1/2004 | Johnson et al. | ............. | 717/162 |
| 6,836,808 B2 * | 12/2004 | Bunce et al. | .................. | 710/20 |
| 6,842,443 B2 * | 1/2005 | Allen et al. | .................. | 370/335 |
| 6,907,469 B1 * | 6/2005 | Gallo et al. | ................. | 709/238 |
| 7,231,430 B2 * | 6/2007 | Brownell et al. | ............ | 709/218 |
| 7,340,535 B1 * | 3/2008 | Alam | ......................... | 709/246 |
| 2001/0043610 A1 | 11/2001 | Nemirovsky et al. | ........ | 370/412 |
| 2002/0083173 A1 * | 6/2002 | Musoll et al. | ................ | 709/225 |
| 2003/0063611 A1 * | 4/2003 | Schaub et al. | .......... | 370/395.32 |
| 2003/0069920 A1 * | 4/2003 | Melvin et al. | ................ | 709/108 |
| 2004/0246956 A1 * | 12/2004 | Meng | .......................... | 370/389 |

OTHER PUBLICATIONS

Overview of Demand Paging; HP; 1997.*

* cited by examiner

*Primary Examiner*—Benjamin R Bruckart
(74) *Attorney, Agent, or Firm*—Baker Botts L.L.P.

(57) ABSTRACT

A packet processing system includes multiple processors and a set of code partitions that implement a feature set for packet processing. Each of the processors is capable of loading and executing one or more of the code partitions. A context manager enables packet processing operations to migrate between code partitions executing on one or more of the processors.

38 Claims, 3 Drawing Sheets

PARTITIONED PACKET PROCESSING IN A MULTIPROCESSOR ENVIRONMENT

TECHNICAL FIELD OF THE INVENTION

The present invention relates generally to communication networks and, more particularly, to partitioned packet processing in a multiprocessor environment.

BACKGROUND OF THE INVENTION

In communication networks, data flow is affected and sometimes constrained by processing times within network equipment. Thus, for example, in packet-based communication networks, processing time for packets within routers and other devices can delay or restrict traffic. Therefore, in packet processing equipment, fast processing capabilities can be critical.

SUMMARY OF THE INVENTION

In accordance with the present invention, techniques for partitioned packet processing in a multiprocessor environment are provided. According to particular embodiments, these techniques enable a multiprocessor system to execute a group of code partitions that together implement a feature set for packet processing. More specifically, these partitions distribute processing functionality across multiple processors and enable packets to be processed by groups of appropriate partitions spanning one or more processors.

According to a particular embodiment, a system for packet processing includes a shared memory, multiple processors, and a context manager. The shared memory maintains code partitions that together implement a feature set for packet processing. Each of the processors includes a processor core and an instruction memory, with the processor core operable to access the shared memory, to load one of the code partitions into the instruction memory, to execute the loaded code partition to perform processing of packets, and to generate migration requests for transferring packet processing operations from the loaded code partition. During packet processing operations, packet context information comprises data, variables, and other program and system state information that is particular to the packet being processed. The context manager receives a migration request from one of the loaded code partitions executing within one of the processor cores, with the migration request identifying packet context information and identifying a target one of the code partitions. The context manager, in response to the migration request, determines whether one of the processors having the target code partition loaded is available to do the processing and, if so, communicates the packet context information to the available one of the processors.

Embodiments of the invention provide various technical advantages. Systems implementing these techniques can provide faster packet processing and can effectively implement a larger set of features as compared to previous techniques. Because of the vast volume of packets crossing through networks, even minor increases in efficiency can have dramatic impacts.

According to particular embodiments, these techniques enable design flexibility during the creation of packet processing partitions. This flexibility can enable system designers and programmers to develop compliant software using more traditional and well-known techniques as compared with other parallel processing techniques.

According to particular embodiments, the partitioned nature of packet processing code, coupled with the techniques for migrating packet processing among the partitions, permits flexibility in configuring processing equipment and features. For example, if a packet processing device is expected to receive a large volume of a particular type of packet, processing for that type of packet can be increased by providing multiple instances of one or more code partitions. Conversely, if a packet processing device is expected to receive a mix of a large variety of packets, a large variety of corresponding code partitions can be distributed across the multiple processors, so that for any packet type there is always a processor that has already been loaded with the code partition for processing that packet type.

Particular embodiments also enable dynamic response to network conditions to provide load-balanced operation. For example, upon detecting a large volume of a particular type of packet, packet processing equipment can potentially respond by increasing its processing capacity for that type of packet.

Particular embodiments also allow for upgrades to existing multiprocessor systems. For example, with the introduction of controlling devices, existing multiprocessor systems can be upgraded to support techniques such as those described within this document.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
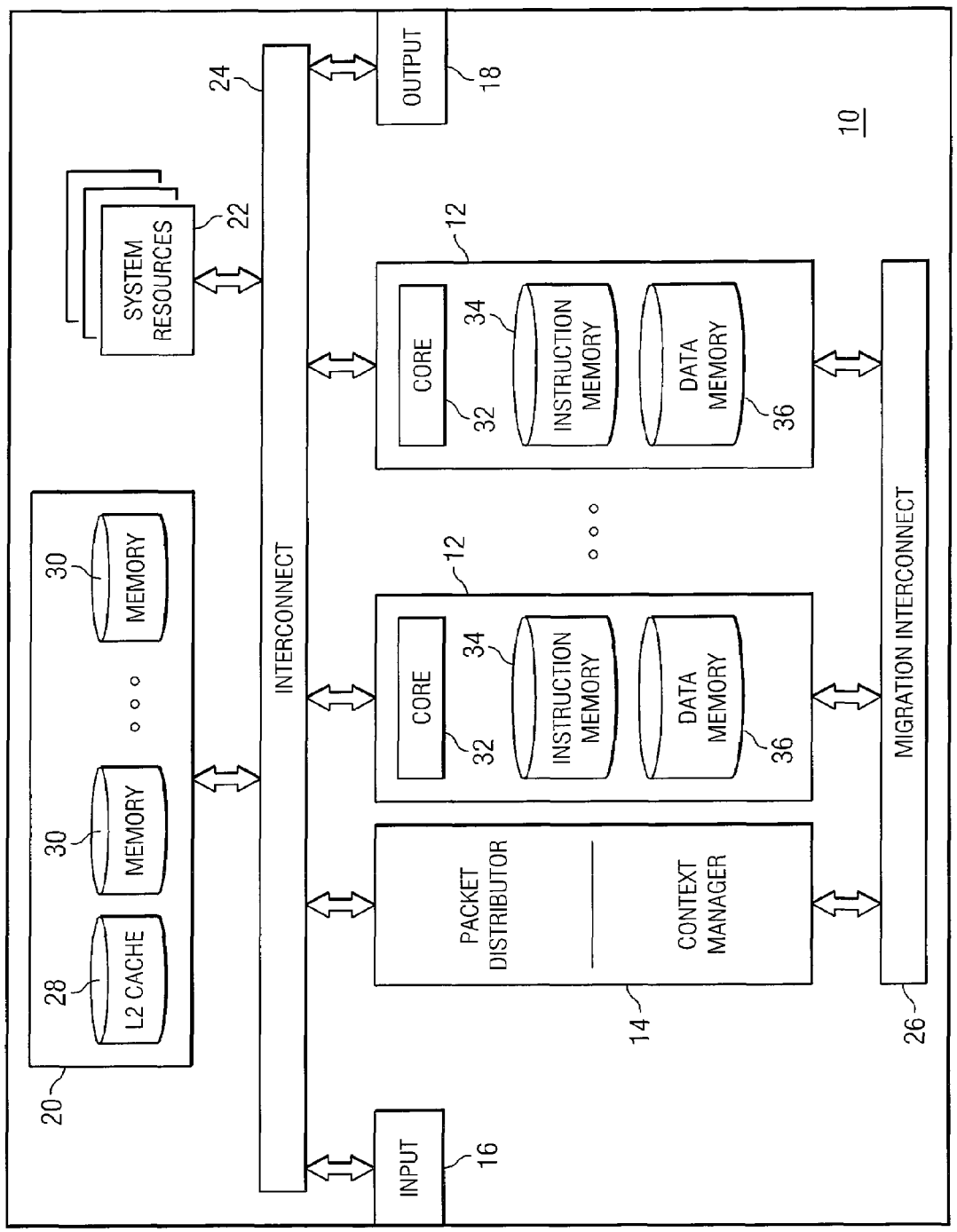
FIG. 1 illustrates a multiprocessor system that provides packet processing using a distribution of code partitions.

FIG. 1 illustrates a multiprocessor system 10, that supports packet processing using code partitions distributed among multiple processors 12. In the embodiment illustrated, system 10 includes processors 12, a packet distributor/context manager 14, an input 16, an output 18, system memory resources 20, and system resources 22. System 10 also includes an interconnect 24 and, in the embodiment illustrated, includes a migration interconnect 26. In general, system 10 supports packet processing by distributing the processing of individual packets across one or more code partitions. More specifically, context manager 14 enables packet processing operations to migrate between one or more code partitions operating across any number of processors 12.

Input 16 represents hardware, including any appropriate controlling logic, for interfacing with other communications equipment to receive information. In the embodiment illustrated and described, input 16 supports the receipt of packets of information, with the term packet encompassing frames, packets, cells, time slices, and/or any other suitable segmentation of information into discrete transmissions.

Output 18 represents hardware, including any appropriate controlling logic, for interfacing with other communications equipment and for transmitting information. Similar to input 16, output 18, in the embodiment illustrated and described, supports the creation, management, and transmission of packets. For example, output 18 may handle gathering, reordering, and transmission of packets processed within system 10. Although input 16 and output 18 are illustrated as separate components within system 10, it should be understood that the functionalities of these two modules may be separated or combined as appropriate.

System memory resources 20, as illustrated, include level-two cache 28 and system memory elements 30. According to particular embodiments, memory modules contained within system memory resources 20 are generally accessible from any processor 12. Therefore, these memory elements may provide for "global" memory resources. In certain embodiments, level-two cache 28 provides for a smaller but faster data storage as compared with memory elements 30. However, while this illustration details particular elements within system memory resources 20, it should be understood that system 10 may include any suitable combination and arrangement of elements providing for shared memory storage accessible by multiple processors 12.

System resources 22 may include traditional elements such as timers, counters, low-speed or auxiliary input/output interfaces, interrupt controllers, program tracing and debugging facilities, power managers, and special-purpose or dedicated instruction or data memories. They may also include networking-specific elements, such as packet-ordering, -buffering, -queueing, and -shaping facilities, statistics counters, encryption and decryption units, table-lookup and pattern-matching circuits, and interfaces to any such elements that are implemented in a separate, external chip. Additionally, system resources 22 may include facilities that are specifically needed in a multiprocessor, multi-threaded environment, such as semaphore and lock managers, message-based inter-process communications mechanisms, thread status and notification mechanisms, and the like.

Each processor 12, as illustrated, includes a processor core 32 and an instruction memory 34. During operation, processor 12 may load information between system memory resources 20 and instruction memory 34. In some embodiments, instruction memory 34 may be organized as a conventional level-one instruction cache, possibly with the conventional ability to lock instructions into the cache. In such embodiments, instruction memory 34 enables faster memory accesses as compared with system memory resources 20. In other embodiments, instruction memory 34 may be organized as a conventionally-addressed, non-cached local instruction memory. Some embodiments may provide a means to select between cached or non-cached modes of operation for instruction memory 34.

In any embodiment, the size and speed of instruction memory 34 are critical. A large size ensures that code for a large number of features can be stored in the memory. Unfortunately, this also affects the total size of the chip, and in a multiprocessor chip, any size increase is multiplied by the total number of processors 12 on the chip. Even if an increased chip-size can be tolerated, larger instruction memories 34 typically have a slower operating speed than smaller ones, which undesirably reduces the maximum operating speed of processor cores 32.

A potential advantage of the present invention is that it places different code partitions into different, relatively small and fast instruction memories 34 and supports migration of packet processing from one processor 12 to another whose instruction memory 34 contains a different code partition. In this way, the number of instructions, or equivalently the number and complexity of features, that can be stored in the set of instruction memories 34 and can applied to any packet is much larger than the number of instructions that can be stored in a single instruction memory 34. This is in contrast to a conventional, parallel-processing, "run-to-completion" multiprocessor architecture in which all of the instructions needed to implement a given feature set either must fit completely into the local instruction memory or cache, or must undesirably be fetched upon demand, from larger but slower system memory resources 20.

Further comparison with the conventional, parallel-processing, "run-to-completion" multiprocessor architecture when supporting a large number of features is appropriate. Given the practical limitations on level-one instruction-cache size, the conventional architecture must provide a large amount of bandwidth between the level-one cache of each processor and system memory resources. If all of the needed instructions do not fit in the level-one instruction cache, instructions must be fetched and re-fetched during the processing of each and every packet, due to cache misses. In contrast, according to particularly described embodiments, instructions of a code partition need to be fetched only when the code partition is loaded into the instruction memory 34; this happens relatively infrequently, even if code partitions are loaded dynamically as described later.

A potential disadvantage, compared with the conventional run-to-completion architecture, is that certain embodiments may require bandwidth to migrate packet context information from one processor 12 to another. However, if the size of the context information times the number of migrations per packet is small compared to the total size of the code that must be executed, then these embodiments may yield a net bandwidth advantage. Some embodiments may present the further advantage that much or all of the bandwidth needed for migration is provided by a dedicated migration interconnect 26 that is separate from the general system interconnect 24.

Returning to FIG. 1, each processor 12 may also include a data memory 36. In some embodiments, the data memory 36 may be organized as a conventional level-one data cache, possibly with the conventional ability to lock data into the cache. In other embodiments, the data memory 36 may be organized as a conventionally-addressed, non-cached local data memory. Some embodiments may provide a means to select between cached or non-cached modes of operation for the data memory 36.

Some embodiments may combine the instruction memory 34 and the data memory 36 into a single memory, although for highest performance, these memories are conventionally kept separate. Therefore, we will henceforth refer to these memories as if they are separate. In addition, while not explicitly shown in FIG. 1, processors 12 may include other elements, such as registers, local memories, functional units, coprocessors, and the like, for use during operation.

Core 32 provides processing capabilities within processor 12. During operation, core 32 executes code or other appropriate instructions to perform processing. For example, core 32 may execute code stored in instruction memory 34 and/or system memory resources 20 to effect processing of packets.

In certain embodiments, core 32 supports multi-threaded operation. That is, core 32 can potentially operate on multiple processing threads. Conventionally, a core that is capable of multi-threaded operation contains a separate copy of any programmer-visible resources, such as program counter and registers, for each thread. For example, core 32 may have eight sets of program counter and registers, thereby permitting simultaneous existence of eight threads, each processing a different packet.

Context manager 14 provides for the migration of packet processing operations into and between processors 12. For example, for a packet received using input 16, context manager 14 may initiate processing of the packet within a particular code partition in a selected processor 12. That processor 12 may, after performing operations using the code partition, request migration of packet processing operations for the packet to another code partition. Context manager 14 handles this migration. A particular example of elements within context manager 14 is illustrated and described more completely below with respect to FIG. 2.

Interconnect 24 enables communications and interactions between elements of system 10. Thus, for example, interconnect 24 may include any suitable combination and arrangement of connectors, buses, wires, switches, rings, and/or other suitable transmission equipment and/or media. According to particular embodiments, system 10 includes a specialized migration interconnect 26 to help provide high speed migration of packet processing operations between processors 12. However, while a dedicated interconnect 26 for specialized operations may provide faster operation, system 10 contemplates using any suitable combination and arrangement of transmission equipment and media for interconnecting various elements.

During operation, system 10 receives and processes packets using code that implements a feature set for packet processing. In many applications, this feature set can require relatively large amounts of code. If processing were to occur within a single processor 12, this code would potentially exceed the size of instruction memory 34. Thus, during operation, processor 12 would likely be forced to "page in" or otherwise access code maintained within slower system memory resources 20.

To combat this problem, system 10 supports distributed processing of packets using code partitions. These code partitions form a group that together implements a packet processing feature set. For example, a set of code partitions may implement a feature set including protocols such as various versions of internet protocol (IP), quality of service protocols, shaping protocols, policing protocols, network address translation, security protocols, and/or other suitable features. Each partition may implement some or all of a protocol or feature, or may implement some or all of multiple protocols or features. The precise division of code between partitions may be determined during design, coding, compilation, and/or other appropriate times and may be driven by any number of considerations. These considerations may lead to various design constraints such as limiting code partitions in size such that one or more may fit within instruction memory 34; incorporating processing tasks focused only on a particular protocol within a code partition; including only related processing tasks within a partition; and/or other appropriate code division constraints.

During operation, system 10 supports transfer of packet processing operations between code partitions using context manager 14. Context manager 14 permits code partitions to migrate packet processing operations using a flexible, dynamic approach that does not limit processing flow. Call manager 14 thus allows each code partition to migrate a packet processing operation to any other appropriate code partition. This does not restrict packet processing to a predetermined series of instruction segments. Rather, this permits a packet processing operation to flow between different code partitions, potentially executing on any number of different processors 12. For example, context manager 14 may start receiving packets within an initial code partition, which then migrates packet processing operations to other appropriate code partitions based on the features called for by the packet.

According to particular embodiments, code partitions use an instruction set extension to effect migration of packet processing operations to other code partitions. For example, upon detecting a need for virtual private network (VPN) processing of a packet, an initial code partition may include an instruction for migrating the packet processing operations to a different code partition for VPN processing. Based upon this instruction, the initial code partition may then transfer the context of the packet processing operations to context manager 14 and identify the target VPN code partition. Context manager 14 then handles migration of the packet processing operations into the identified code partition. This allows code partitions to make function-call-type transfers to other code partitions.

To effectively handle the migration of packet processing operations between code partitions, context manager 14 supports the exchange of packet context information that describes the current state of processing operations for packets. According to particular embodiments, context information for each packet may include information such as a local state of data, for example, variables and pointers, including a pointer to the packet, all stored in a push-down stack; a stack pointer to the top of the stack; local memory, if any; register values; and a program-counter "return address"—the address at which instructions should resume execution if and when packet processing operations are to be migrated back to the current code partition. "Global data" is typically not part of a context; it is data that is available when processing any packet, such as statistics, configuration, or status information, and it is typically referenced by or through fixed addresses.

The current packet that is being processed is also part of the packet context, and must be considered when migrating packet processing operations from an "originating" processor 12 to a "target" processor 12. In some embodiments, the current packet is completely and only stored in system memory resources 20, so it is accessible from any processor 12. The context used by an originating processor 12 does not contain the packet, only a pointer to the packet in system memory resources 20, and only this pointer must be transferred to the target processor as part of the context information. In other embodiments, for faster operations, a portion, such as the header, of the current packet may be stored in registers or local memory of the originating processor 12. In this case, during migration operations, any such portion of the packet that has been modified or whose contents are not otherwise available outside of the originating processor 12 must be updated in the system memory resources 20, or must be treated as being part of the context information and be transferred to the registers or local memory of the target processor 12, or both.

Typically, the push-down stack and global data are maintained within system memory resources 20. Since this information is accessible from any processor 12, this information need not be transferred during migration of packet processing operations. Also, in typical embodiments, the local memory, if any, in a processor 12 is used as a "scratchpad" for intermediate computations within a code partition, but its contents are no longer needed when the processing operations are to be migrated to another code partition. Thus, in certain circumstances, migration of operations may simply require the transfer of the stack pointer and register values.

In some embodiments, to limit the need for data transfer during migration, code partitions may push register values and any needed local-memory values into the push-down stack before migrating the packet processing operations to another code partition. Also, the address of the instruction following the migration instruction (the program-counter "return address") may also be pushed onto the push-down stack. Therefore, in certain embodiments, code partitions may migrate packet processing operations using context information that includes only a stack pointer.

Thus, for example, a code partition may request migration of packet processing operations by sending a migration request to context manager 14, with the request identifying migration data which identifies the context information, a target code partition and, in some embodiments, one of a plurality of possible entry points within the target code partition. In this example, the context information comprises only a stack pointer. Context manager 14 may then handle the migration of the context information to the identified code partition, potentially within a target processor 12 that is different from the originating processor 12. Context manager 14 will pre-load the stack pointer of the target processor 12 with the identified value and will then command the target processor 12 to execute instructions beginning at the identified entry point or, in embodiments where no entry point is identified, at a predetermined or default entry point. In more complex embodiments, the context manager 14 will pre-load the registers and/or local memory of the target processor 12 with values from the identified context information.

Note that as described above, the context information that is delivered to a target processor 12 includes a pointer to a stack which in turn stores a "return address." This allows for conventional, nested call/return style procedure and function operation, even when calling between procedures and functions that exist in different code partitions. For this reason, the return address that is passed in the context information may be encoded as partition name/number and entry point, rather than as an absolute memory address. In this way, a "return" operation is a migration request just like any other—except that it uses the partition and entry-point information that was saved on the stack—and the calling program's operation may be resumed on a different processor 12 than the one that made the original procedure or function call. If call/return style operation is not needed, then the return address need not be included in the context information or in the stack.

As explained previously, different context information is used for each packet, and during processing, this context information may be stored in dedicated resources in processor 12. For example, a multi-threaded processor 12 may have a separate set of registers and/or a dedicated local memory for each thread. When a migration request identifies context information, it identifies which portion of these dedicated resources contains information needed to continue processing the packet. In some embodiments, the only or default identification may be "all resources needed," while other embodiments may have the ability to identify only a subset of the registers and/or a portion of the dedicated local memory needed to continue processing each packet. In any embodiment, when we say that a migration request identifies context information, we also include the case where the migration request actually contains a copy of some or all of the context information.

In some embodiments, a portion of the context information for each packet may be stored in system memory resources 20. A portion or block of system memory resources 20 is allocated to each packet after it arrives. In some embodiments, this allocation may be performed by context manager 14, and in other embodiments it may be performed by software in an initial code partition running on one of processors 12. Later, when a packet leaves the system or is discarded, the corresponding block of system memory is returned to a free pool to be re-used later for processing another packet. As in a conventional multiprocessor, system memory resources 20 are accessed using "global" addresses, and can therefore be accessed by any processor 12 when running any code partition. So, the context information is accessible by any processor 12 to which the packet processing may be migrated.

System 10 contemplates code partitions between distributed among processors 12 in any suitable fashion. As previously noted, certain embodiments include code partitions with each partition at least small enough to fit within instruction memory 34 of a single processor 12. Thus, for example, each processor may include one or more code partitions within its instruction memory 34. In addition, copies of a single code partition may be loaded into multiple processors 12. Thus, for example, a code partition that requires greater than average processing time and/or that is expected to be called upon frequently may be loaded into more processors 12 as compared with code partitions that process quickly or that may only be infrequently called upon. This distribution of code partitions within processors 12 enables system 10 to be configured for performance according to expected and/or actual network traffic.

Moreover, as previously noted, each processor 12 may provide for multi-threaded operations. Thus, for example, if processor 12 has only a single code partition, all of the available threads within core 32 may be assigned to process packets using that code partition. As another example, if instruction memory 34 includes multiple code partitions, the threads within core 32 may be assigned statically or dynamically among those code partitions. The distribution of code partitions among processors 12 and the assignment of threads among these code partitions may take place at any time during set up, start up, or operation. For example, if system 10 is expected to be installed in an environment in which particular network traffic is to be expected, the system manufacturer or distributor may configure system 10 such that sufficient threads are assigned for operating on each particular code partition. Similarly, at start up, an administrator may provide for this type of configuration. Additionally or alternatively, system 10 can monitor network traffic and dynamically adjust thread and/or code partition assignments. For example, system 10 may initially be configured to expect a large volume of a particular kind of traffic, with a large number of processors 12 having code partitions tailored for processing this type of network traffic. If unexpected network traffic patterns emerge, system 10 may reassign threads and/or processors 12 to different code partitions for handling other types of network traffic. Thus during operation, each code partition from a set of code partitions will have a static or dynamic set of assigned processors 12 and/or threads within these processors 12. This provides a pool of threads associated with each code partition.

As previously noted, context manager 14 handles migration of packet processing operations between code partitions. According to particular embodiments, context manager 14 tracks processors 12 having each code partition and, upon receiving a migration request, handles transfer of packet processing operations into an available thread on one of the processors 12 that has the identified code partition. For example, context manager 14 may receive a migration request that contains context information (such as a stack pointer) and identifies a target code partition and entry point. Context manager 14 attempts to identify a processor 12 that has the targeted code partition and an available thread It then transfers the context information to the identified processor 12, which begins executing instructions in the identified available thread at the identified entry point.

In some embodiments, code partitions may not be permanently resident in instruction memory 34 of a processor 12. In such embodiments, context manager 14 may receive a migration request that identifies a target code partition that is not currently resident in instruction memory 34 of any processor 12. In that case, before transferring the context information and causing instructions to be executed at the identified entry point, context manager 14 selects a processor 12 where the target code partition is to be loaded. In some embodiments, it may then pre-load the instructions of the target code partition from system memory resources 20 into the instruction memory 34 of the selected processor 12. In other embodiments, especially if instruction memory 34 is a cache, it may rely on the processor 12 itself to fetch instructions from system memory resources 20 automatically as needed into instruction memory 34.

Even if an identified target code partition is already resident in one or more processors 12, context manager 14 may elect to allocate additional resources if no suitable thread is currently available on such processors to handle packet processing operations. For example, context manager 14 could increase the number of threads, if available, on such processors that may execute instructions from the identified target code partition. Alternatively, context manager 14 could select an additional processor 12, if available, where the target code partition is to be loaded, and pre-load the instructions or allow them to be fetched automatically into its instruction memory 34 as discussed previously.

In certain embodiments, context manager 14 may receive migration requests when there are currently no available resources—processors 12 or threads—to handle packet processing operations. In such embodiments, fulfillment of the migration request must be deferred until suitable resources—processors 12 and threads—become available. An embodiment uses a set of queues to manage the migration of packet processing operations between code partitions. For example, for each code partition, context manager 14 may maintain a queue of migration requests for that code partition. When a migration request is received for a particular code partition, its migration data is placed into the corresponding queue. When a thread for that code partition becomes available, context manager 14 selects a migration request from the queue and migrates the associated packet processing operations to the available thread.

Thus, for example, consider system 10 receiving a packet at input 16. Context manager 14 may schedule this packet to begin processing by identifying the packet context information in migration data and placing this migration data into a queue associated with a code partition for initial packet processing. Alternatively, if the associated queue is empty and a thread for this code partition is currently available, context manager 14 may directly migrate processing operations to the available thread. After the migration to processor 12 associated with the available thread, that processor 12 executes the selected code partition based upon the received context information. At some point, that code partition may encounter a migration instruction. Either before or as result of encountering that instruction, the code partition may resolve all outstanding external transactions (such as memory and I/O accesses and inter-processor/co-processor communications) and push register values and a return address into the stack associated with the packet processing operations. Processor 12 may then send a migration request to context manager 14 that identifies relevant context information for the packet processing operations and that identifies a target code partition for continuing processing of the packet. In this fashion, packet processing may be handled by any number of code partitions across one or more processors 12 before processing is complete. Once packet processing is complete, the packet may be communicated to an appropriate remote resource using output 18.

It is important to describe a few more operational details of the context manager 14 and the structure of the code partitions. A sequence of computer instructions, such as a procedure or function, to perform a set of operations is conventionally identified by a "starting memory address." This is typically an absolute address in system memory resources 20 which is "called" to transfer control to that sequence of instructions. A code partition may be identified in a similar way, but this is convenient only if each processor's instruction memory 34 is a cache. In that case, the code partition can be stored in different locations in each different instruction memory 34, depending on the current availability of space in each instruction memory 34.

In certain embodiments, each instruction memory 34 is a conventionally-addressed, non-cached local instruction memory. Identifying a code partition by an absolute memory address is not desirable in such an embodiment, because the code partition would have to be stored in exactly the same location in the instruction memory 34 of each processor 12 into which the code partition was loaded. In such embodiments, a different method can be used. A code partition is identified by a partition number, and each processor 12 has an associated processor number. Context manager 14 may use a small table, called the partition table, to translate the combination of the partition number and processor number into the starting memory address of the specified code partition in instruction memory 34 of the specified processor 12.

When context manager 14 loads a particular code partition into the instruction memory of a particular processor 12, it updates the partition table to indicate the starting memory address of that particular code partition in the instruction memory of that particular processor 12.

In a particular embodiment, the partition table is subdivided and indexed first into partition maps, one map for each code partition. Each partition map is further indexed by the processor number, which selects an entry containing the starting memory address of the corresponding code partition in instruction memory 34 of the corresponding processor 12.

Because the code partitions' starting memory addresses in each instruction memory 34 are specified indirectly through the partition table, context manager 14 has flexibility in packing multiple code partitions into each instruction memory 34, allowing the use of limited-size instruction memories 34 to be optimized. For example, consider an embodiment in which the size of each instruction memory is 8000 bytes, and code partitions number 1, 2, 3, and 4 have sizes 1000, 2000, 3000, and 4000 bytes, respectively. Processor number 1 could have code partitions 1, 3, and 4 loaded at addresses 0, 1000, and 4000, respectively, while processor 2 could have code partitions 2 and 4 loaded at addresses 0 and 2000. If the workload were to change such that the second copy of code partition 4 is no longer needed on processor 2, but additional copies of code partitions 1 and 3 are needed, then processor 2 could be loaded with code partitions 1 and 3 at addresses 2000 and 3000, while retaining the copy of code partition 2 at address 0.

In the just-described embodiments in which instruction memory 34 is a conventionally addressed, non-cached local instruction memory, conventional methods can be used to allow a code partition to be loaded starting at any address in instruction memory 34. Some processor architectures support the creation of position-independent code (PIC), where the code does not contain any absolute memory addresses, and therefore the code can be loaded at any starting memory address. If PIC is not available, then context manager 14 can use conventional relocating linker and loader methods to adjust any absolute memory addresses in the code to the proper values when it loads the code into a selected starting address in instruction memory 34.

From the point of view of optimal usage of instruction memory space, packing a given set of code partitions into instruction memories 34 is equivalent to a conventional "bin-packing" problem, and conventional software algorithms can be used to find an optimal assignment. This is a suitable approach in embodiments in which code partitions are assigned when the system is configured, for example, by the manufacturer, distributor, or administrator.

However, the described concepts are also anticipated to be used in more dynamic environments, in which code partitions are added and removed as dictated by changing network conditions and received packet types. In this case, a series of adds and removals of different-size code partitions will eventually lead to a condition that may be referred to as external memory fragmentation or checkerboarding. In this condition, the total amount of available memory in an instruction memory 34 may be large enough to contain a desired code partition, but no single contiguous unallocated region or "hole" in the memory is large enough to contain it.

The problem of checkerboarding in these environments can be solved by applying the concept of paging. In this solution, code partitions are further subdivided into a number of fixed-size pages, for example, 1000 bytes, and each instruction memory 34 is likewise subdivided into pages of the same fixed size. The unit of memory allocation is one page, and a code partition can be loaded into an instruction memory 34 as long as the number of available pages is at least as large as the number of pages in the code partition. The code partition's pages can then be scattered into the available pages of the instruction memory 34, regardless of the checkerboard pattern of available pages.

In operation, the paging solution may need a mechanism to handle the scattering of pages in the physical instruction memory. For example, after processor 12 executes the last instruction in a page, the next instruction will not normally be found in the next sequential address in the instruction memory; instead, it will be at the first address in the code partition's next page, which could be any page in the instruction memory.

A processor 12 could use the conventional approach of a hardware-based page table to map the "logical" or "virtual" addresses in a code partition to "physical" addresses in instruction memory 34 at run time. However, as described previously, in some embodiments context manager 14 may use conventional relocating linker and loader methods to adjust any absolute memory addresses in the code. In such an embodiment, or even in an embodiment that supports PIC, a relocating linker and loader method can be augmented to adjust the code to account for the actual assignment of the code partition's "logical" addresses to the instruction memory's "physical" addresses. Basically, to reflect the actual page assignment, it can: (a) adjust any absolute addresses in the code, as before; (b) adjust any branch or jump-target offset that goes to a different page to reflect the new offset after assignment; and (c) insert a jump or branch instruction at the end of each page to go to the first physical address assigned to the next logical page. The last step increases the size of the code partition slightly, by one instruction per page in the code partition, and as a result may occasionally increase the size of the code partition by one page.

The preceding description and the illustration provided detail elements for system 10 to provide migration of packet processing operations between code partitions running on multiple processors 12. However, while specific elements are illustrated and described, system 10 contemplates including any appropriate combination and arrangement of elements to support migration of packet processing operations among multiple processor devices. For example, while illustrated as including an integrated context manager 14, this element may be implemented by an add-on or external device. In this scenario, context manager 14 may enable the retrofitting of existing and/or future multiprocessor systems that are not inherently capable of implementing migration techniques.

For example, an external context manager 14 may add migration capabilities to an existing, conventional multi-threaded, multiprocessor system with very little modification or even no modification of the existing system. To perform a migration operation, a thread on a processor 12 in the existing system may perform a conventional "write" operation to the external context manager 14, where the address and/or data in the write operation contains the migration data. After performing this operation, the thread can put itself to sleep using a conventional "WAIT" instruction. When the external context manager 14 wishes to migrate packet processing operations to the sleeping thread, it can do so using a conventional interrupt directed to the sleeping thread on the selected processor 12. The context information can be passed to the selected processor and thread in a predetermined location in the system memory resources 20 or in a predetermined register in the external context manager, associated with the selected processor and thread. Further refinements may allow the external context manager to query the existing system to determine information such as the awake/asleep status of individual threads, and performance information, such as idle time, cache misses, and memory stalls, for each processor 12. This information can be used not only for basic migration operations, but also to optimize the assignment of code partitions to processors 12 for load balancing as discussed later.

In some embodiments, the context manager 14 may be implemented as software executing on one or more of the processors 12 in the system 10. This embodiment may be particularly attractive, since it may not require any special hardware development, only software code to embody the methods described in this disclosure. Furthermore, a context manager 14 that is implemented on a processor 12 is well suited to perform the relocating linker and loader methods described previously. A processor 12 that is executing code partitions can perform a migration operation by writing the migration data into the system memory resources 20 and then posting a software interrupt or other signal to a processor 12 that is serving as the context manager 14.

Figure 2:
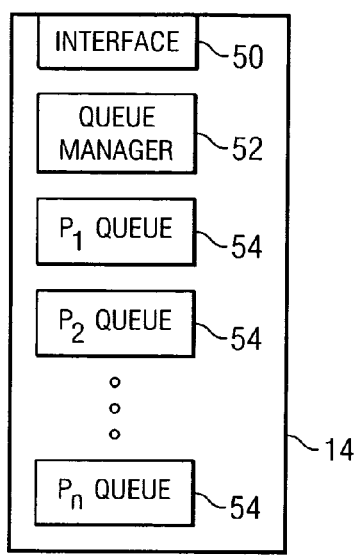
FIG. 2 is a block diagram illustrating functional elements of an exemplary context manager from the system.

FIG. 2 is a block diagram illustrating exemplary functional elements within context manager 14 that include an interface 50, a queue manager 52, and multiple queues 54. These elements of context manager 14 enable migration of packet processing operations between multiple processors 12 within system 10 and, in the embodiment illustrated, context manager 14 handles this migration using multiple queues 54.

During operation, context manager 14 may provide any number of functions to support the migration of packet processing operations among code partitions distributed between processors 12. These functions may include, for example, initial packet processing, handling of migration requests, and queue servicing. When system 10 initially receives a packet, context manager 14 may provide for initial processing and/or distribution of the packet to an appropriate code partition. For example, upon detecting a received packet, queue manager 52 may identify that packet context in migration data placed into a queue for a code partition that handles initial packet processing. Alternatively or in addition, context manager 14 may perform some initial diagnosis or processing of the received packet to determine an appropriate initial code partition to receive the packet context information. For example, context manager 14 may identify a protocol used by a received packet and may then place the corresponding migration data including the packet's context in queue 54 associated with an appropriate code partition.

Context manager 14 also handles migration requests received from code partitions operating within processors 12. For example, context manager 14 may receive a migration request from one of processors 12, with the request identifying packet context information and a target code partition. The packet context information, as previously discussed, may include any suitable data for use by the target code partition to perform processing of a packet. For example, this context information may identify a stack pointer, a return address, and/or include other data as appropriate. Upon receiving a request, context manager 14 may place the request into queue 54 associated with the target code partition. Thus, queue manager 52 may store the request within an appropriate one of queues 54.

In some embodiments, the request comprises only the packet context information and the identification of the target code partition. Since each queue is associated with a particular code partition, the queue need not store the identification of the target code partition, since this is implicit and identical for every request stored in that queue. The queue stores only the packet context information.

In other embodiments, the request also identifies one of a plurality of entry points within the target code partition. In this case, the queue may also store an identification of the entry point. In some of these embodiments, the entry point may be identified conventionally as an offset program-counter value relative to the beginning of the code partition. In others, the entry point may be identified by a small index value, and the starting program-counter value is obtained by using this index to access a small table of program counter values that associates entry-point index values for a specified code partition with program counter values for that code partition.

Context manager 14 also handles servicing of queues 54. For example, queue manager 52 may monitor queues 54 and available processing threads associated with these queues 54. When a processing thread becomes available for a selected queue 54 that has a pending migration request, queue manager 52 may service that queue 54 by migrating the packet context to the available processing thread. In addition to supporting queuing of migration requests, queue manager 52 may also support the bypassing of queues 54. For example, if a targeted queue 54 is empty and an appropriate processing thread is currently available, queue manager 52 may bypass the targeted queue 54 and immediately migrate the packet context to the available processing thread.

In some embodiments, queues 54 may support simple, conventional first-in, first-out (FIFO) behavior. In other embodiments, they may support more complex behaviors. In particular, it is desirable for routers to deliver packets belonging to a particular packet flow to output 18 in the same order in which they were received at input 16. Because of the variability of processing times when packets in the same flow are distributed to multiple processors 12, order may not be maintained. However, it is possible for packets to be "timestamped" or otherwise have their arrival order identified when they arrive by input 16, or by context manager 14, or by an initial code partition. This timestamp information can be manipulated and/or augmented by the code partitions, and can be included as part of the identified context information or included directly in the migration data. In this way, context manager 14 may examine timestamp information and ensure that the "oldest" packet in a given queue is migrated before any "younger" packets.

Context manager 14 may enforce packet order on an absolute basis for all packets in a given queue, or it may use augmented information to force order to preserved only for packets belonging to a particular packet flow. It may preserve order by ensuring that packets are inserted into the queue "in order," that is, by inserting each new packet into the queue closer to the head of the queue than any younger packet; or by removing packets "in order," that is, by scanning the entire queue for the oldest packet each time it removes a packet; or by any other method that preserves packet order as required.

According to particular embodiments, context manager 14 may enable dynamic configuration of code partitions and/or thread assignments within processors 12. For example, queue manager 52 may monitor queue depths within queues 54 and, based upon these depths, identify processing bottlenecks and/or over-allocated resources. In response to detecting an unbalanced allocation of resources, context manager 14 may modify the assignment of code partitions among processors 12 and/or modify the assignments of threads to particular code partitions.

While the embodiment illustrated and the preceding description focus on a particular embodiment of context manager 14 that includes specific elements, system 10 contemplates incorporating and/or coupling to any suitable combination of equipment and/or logic to support the migration of packet processing operations between multiple code partitions. Thus, for example, while context manager 14 is illustrated as including queues 54, these queues may represent statically or dynamically allocated memory resources either internal or external to system 10. Moreover, context manager 14 may use mechanisms other than queues to handle migration requests. Also, it should be understood that the functionalities performed by the particular elements illustrated may be separated or combined as appropriate, and context manager 14 may include fewer or additional functional modules as appropriate. Additionally, while specific functional elements are shown within context manager 14, system 10 contemplates providing some or all of these functionalities using logic encoded in media.

Figure 3:
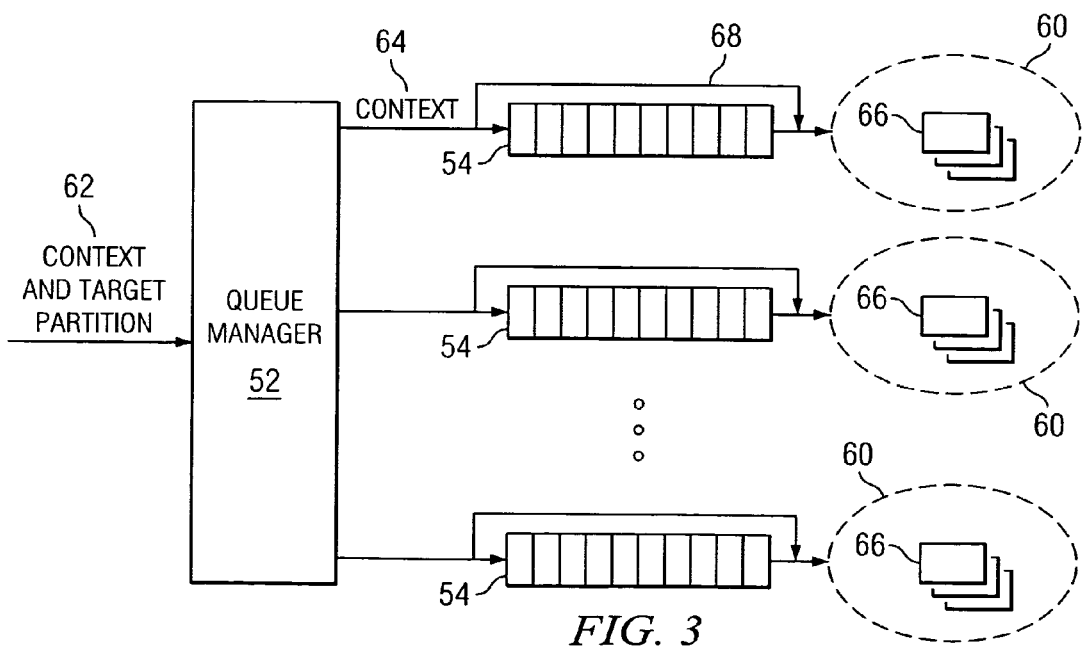
FIG. 3 is a logical diagram illustrating queuing and distribution of packet processing among multiple code partitions and threads to support migration of packet processing between partitions.

FIG. 3 is a logic diagram illustrating migration of packet processing operations into, around, and from multiple queues 54 into associated process thread pools 60. As shown by this illustration, queue manager 52 may, as indicated at 62, receive a migration request including packet context information and a target code partition. As indicated at 64, queue manager 52 distributes the packet context information for migration to a process thread 66 associated with the target code partition. As previously discussed, queue manager 52 may determine whether the associated pool 60 includes an available process thread 66 before queuing the packet context information for migration. Thus, if the associated queue 54 is empty and if there is an available process thread 66, queue manager 52 may bypass queue 54, as indicated at 68. Otherwise, queue manager 52 may queue the packet context information in the appropriate queue 54.

By displaying logical pools 60 that include multiple process threads 66, this diagram illustrates that each code partition may potentially have one or more instances across multiple processors 12 and, within each such processor 12, may have one or more available processing threads. However, it should be understood that this logical diagram is presented only to clarify the operation of particular embodiments, and system 10 contemplates context manager 14 using any appropriate elements, data storage devices, data storage constructs, and logical processes for managing migration of packet processing operations between multiple code partitions operating on multiple processors 12.

Figure 4:
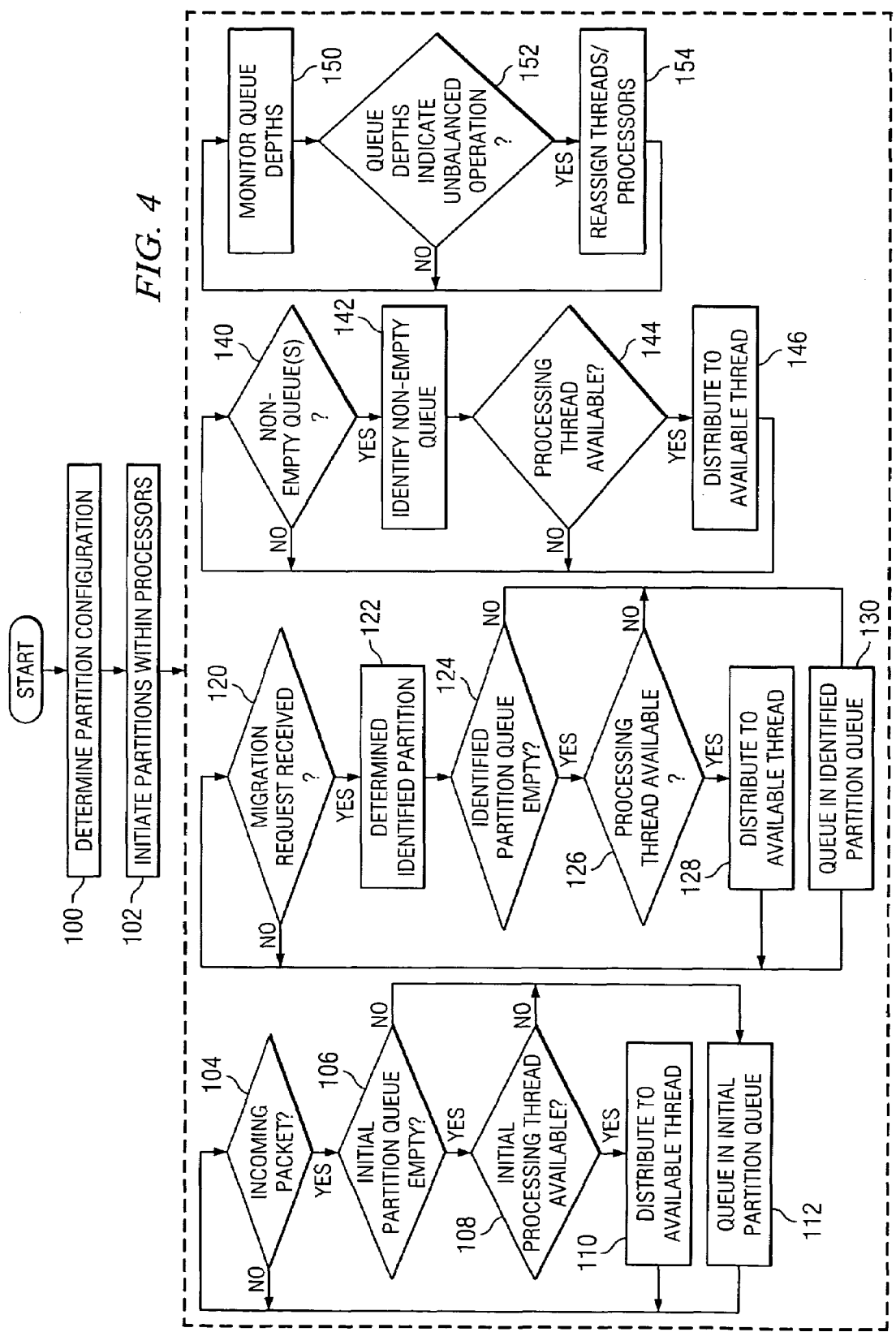
FIG. 4 is a flowchart illustrating a method for managing migration of packet processing between code partitions.

FIG. 4 is flowchart illustrating a method for context manager 14 to manage migration of packet processing operations between multiple code partitions operating on multiple processors 12. Either at start up or some other appropriate time, context manager 14 determines a partition configuration at step 100. For example, an administrator may specify expected network traffic, and context manager 14 may determine an appropriate distribution of code partitions and assignment of processing threads based upon the expected traffic. Using a determined configuration, context manager 14 initiates code partitions within processors 12 at step 102.

As illustrated by this flowchart, context manager 14 may then perform a variety of operations to support and manage the migration of packet processing operations between code partitions. At step 104 through step 112, context manager 14 monitors for and handles the receipt of incoming packets from input 16. Context manager 14 monitors for such an incoming packet at step 104. Upon detecting an incoming packet, context manager 14 determines whether a queue for an initial processing partition is empty at step 106. If not, context manager 14 may generate and queue migration data for this packet in the initial partition queue at step 112. If context manager 14 determines that the initial partition queue is empty at step 106, context manager 14 may determine whether a processing thread for the initial code partition is available at step 108. If not, context manager 14 once again resorts to queuing migration data for the packet in the initial partition queue at step 112. However, if an initial processing thread is available at step 108, context manager 14 may migrate the packet context to the available thread at step 110.

At step 120 through step 130, context manager 14 handles the receipt of migration requests. Context manager 14 monitors for received migration requests at step 120. Upon receiving such a request, context manager 14 determines the identified partition at step 122. For example, within the migration request, the requesting code partition may identify a target code partition for continuing processing. Context manager 14 determines whether the identified partition queue is empty at step 124. If not, context manager 14 queues the migration data in the identified partition queue at step 130. However, if the identified partition queue is empty, context manager 14 determines whether an associated processing thread is available at step 126. If not, context manager 14 once again resorts to queuing the migration data in the identified partition queue at step 130. However, if a processing thread is available, context manager 14 may bypass the identified queue and migrate the packet context to the available thread at step 128.

At step 140 through step 146, context manager 14 provides for monitoring and servicing of queues 54. Context manager 14 determines whether there are any outstanding migration requests in one of queues 54 at step 140. If so, context manager 14 identifies one of queues 54 including information for a migration of packet processing operations at step 142. Context manager 14 then determines whether a processing thread associated with this queue 54 is available at step 144. If so, context manager 14 migrates a packet context from queue 54 to the available processing thread at step 146. In this manner, context manager 14 continuously monitors and services queues 54.

At step 150 through step 154, context manager 14 provides for dynamic reallocation of processing resources based upon system conditions. Context manager 14 monitors queue depths at step 150 and determines whether the queue depths indicate unbalanced operations at step 152. If so, context manager 14 may reassign threads and/or code partitions within and among processors 12. This enables system 10 to respond to unexpected and/or otherwise changing network conditions. However, while illustrated as triggering upon queue depths, system 10 contemplates context manager 14 using any suitable information or settings for dynamic load balancing. For example, context manager 14 may automatically reconfigure thread and code partition assignments based upon the time of day, administrator commands, and/or other appropriate criteria.

The illustrated flowchart and accompanying description provide an exemplary method for context manager 14 to manage the migration of packet processing operations among multiple code partitions distributed among multiple processors 12. However, while the preceding flowchart and accompanying description illustrate a particular method for managing migration, this provides only an exemplary method of operation. System 10 contemplates context manager 14 using any appropriate techniques to provide these and/or other appropriate operations. Thus, many of the steps in this flowchart may take place simultaneously and/or in different orders than as shown. In addition, context manager 14 may use methods with additional steps, fewer steps, and/or different steps, so long as the methods remain appropriate.

Figure 5:
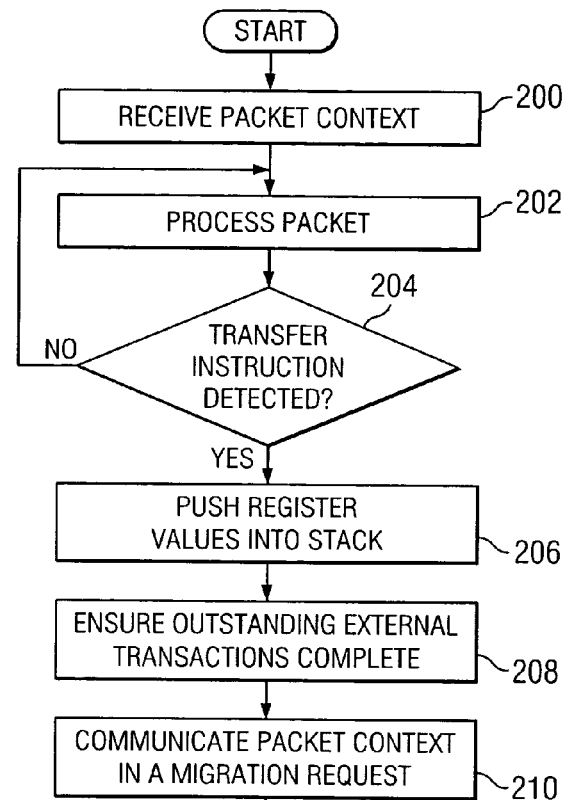
FIG. 5 is a flowchart illustrating a method for packet processing within a code partition.

FIG. 5 is a flowchart illustrating a method for a code partition within processor 12 to receive a packet context, perform packet processing operations for the packet, and to request migration of these packet processing operations to another code partition. The code partition within processor 12 receives a packet context at step 200. As previously discussed, this packet context may include any appropriate identifiers and information for initiating and/or taking over packet processing operations for a packet. Using this information, processor 12 executes code from the code partition to process the packet at step 202.

Upon detecting a transfer instruction at step 204, processor 12 may initiate actions to simplify migration of packet processing operation. Thus in the embodiment illustrated, processor 12 pushes register values into a stack associated with the packet processing at step 206 and insures that all outstanding external transactions are complete at step 208. This reduces locally stored data to simplify transfer of packet processing operations. Processor 12 communicates the current packet context in a migration request to context manager 14 at step 210. The processing thread associated with this processing activity then becomes available for receiving and operating upon another packet context.

As with the previous flowchart, this flowchart and the accompanying description illustrate only a particular method for operation. Therefore, while a particular method is illustrated, system 10 contemplates processors 12 using any appropriate techniques to provide for receiving, processing, and migrating packet processing operations. Thus, many of the steps in this flowchart may take place simultaneously and/or in different orders than as shown. In addition, processor 12 may use methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A system for packet processing, the system comprising:
a shared memory maintaining a plurality of code partitions, the code partitions together implementing a feature set for packet processing;
a plurality of processors each comprising a processor core and an instruction memory loaded with at least one of the code partitions from the shared memory, the processor core operable to execute the loaded code partition to perform processing of packets and to generate migration requests for transferring packet processing operations from the loaded code partition;
a context manager operable to receive a migration request from one of the loaded code partitions executing within one of the processor cores, the migration request comprising packet context information and identifying a target one of the code partitions, the context manager further operable, in response to the migration request, to identify an available one of the processors having the target code partition loaded, and to communicate the packet context to the available one of the processors;
wherein the context manager maintains a plurality of queues each corresponding to one of the code partitions, the context manager further operable, in response to the migration request, to place migration data comprising the packet context information into the queue associated with the target code partition, to monitor the queue associated with the target code partition, and upon determining that one of the processors having the target code partition loaded is available for processing, to communicate the packet context information to the available one of the processors;
wherein an initial one of the code partitions includes instructions for initial packet processing that identify a plurality of processing functions and, for each of the processing functions, include a migration instruction associated with the processing function that indicates another one of the code partitions; and
wherein a selected one of the processors assigned the initial code partition is operable to receive packet context information associated with a received packet, the selected processor further operable, by executing the initial code partition, to identify characteristics of the received packet that correspond to one of the processing functions, to select the migration instruction associated with the identified processing function and to generate a migration request that comprises the received packet context information and targets the other one of the code partitions indicated by the selected migration instruction.

2. The system of claim 1, wherein the context manager is further operable to service each of the queues using a first in first out servicing schedule.

3. The system of claim 1, wherein the context manager is further operable to track an age for each entry in the queues and to service each of the queues based on the age for each of the entries.

4. The system of claim 3, wherein the age for each of the entries identifies a time when a packet corresponding to the entry was received by the system.

5. The system of claim 1, wherein prior to placing the migration data into the queue associated with the target code partition, the context manager is further operable to determine that the queue associated with the target code partition is empty and, in response, to bypass the queue by communicating the packet context information to the available one of the processors.

6. The system of claim 1, wherein the packet context information comprises a stack pointer that indicates a location in the shared memory.

7. The system of claim 1, wherein each of the processors further comprises registers and is further operable, when processing a received packet, to transfer values out of selected ones of the registers into a stack in the shared memory prior to transmitting a migration request for the packet to the context manager.

8. The system of claim 1, further comprising: a first interconnect coupling the shared memory and the processors; and
a second interconnect coupling the processors and the context manager, wherein the second interconnect provides a dedicated link for transferring at least a portion of packet processing information between the code partitions operating on the processors.

9. The system of claim 1, wherein the context manager is further operable to assign some or all of the code partitions among the processors, to detect unbalanced operation that delays processing due to a selected one of the code partitions, and to reassign the code partitions such that the selected one of the code partitions is assigned to an increased number of the processors after the reassignment.

10. The system of claim 1, wherein the migration request further identifies one of a plurality of entry points within the targeted code partition.

11. The system of claim 10, wherein the migration request identifies the entry point using a program-counter offset from the beginning of the targeted code partition.

12. The system of claim 10, wherein the migration request identifies the entry point using an index to a table entry.

13. The system of claim 1, wherein at least one of the code partitions in the shared memory is not loaded in the instruction memory of any of the processors.

14. The system of claim 13, wherein the context manager is further operable to receive a migration request targeting one of the code partitions not loaded into one of the instruction memories and, in response, to initiate loading of the targeted one of the code partitions into the instruction memory of at least one of the processors.

15. The system of claim 1, wherein each of the code partitions comprises one or more pages of instructions, and wherein each of the instruction memories is further operable to load selected ones of the code partitions using a paging scheme.

16. The system of claim 1, wherein at least one of the processors is further operable to execute a plurality of processing threads, each of the processing threads operable to separately perform processing of packets using a loaded one of the code partitions.

17. A context manager for handling migration of packet processing, the context manager comprising:
a processor; and
a computer-readable medium comprising a program of instructions, the program of instructions comprising:
an interface operable to couple to a system comprising a plurality of processors and a shared memory maintaining a plurality of code partitions, wherein the code partitions together implement a feature set for packet processing and wherein each of the code partitions is assigned as unloaded or is assigned to at least one of the processors;

a migration manager operable to receive a migration request from a selected one of the processors, the migration request comprising packet context information and identifying a target one of the code partitions, the migration manager further operable, in response to the migration request, to identify an available one of the processors having the target code partition assigned, and to communicate the packet context to the available one of the processors;

wherein the migration manager maintains a plurality of queues each corresponding to one of the code partitions and is further operable, in response to the migration request, to place migration data comprising the packet context information into the queue associated with the target code partition, to monitor the queue associated with the target code partition, and upon determining that one of the processors having the target code partition loaded is available for processing, to communicate the packet context information to the available one of the processors;

wherein an initial one of the code partitions includes instructions for initial packet processing that identify a plurality of processing functions and, for each of the processing functions, include a migration instruction associated with the processing function that indicates another one of the code partitions; and wherein a selected one of the processors assigned the initial code partition is operable to receive packet context information associated with a received packet, the selected processor further operable, by executing the initial code partition, to identify characteristics of the received packet that correspond to one of the processing functions, to select the migration instruction associated with the identified processing function, and to generate a migration request that comprises the received packet context information and targets the other one of the code partitions indicated by the selected migration instruction.

18. The context manager of claim 17, wherein the migration manager is further operable to service each of the queues using a first in first out servicing schedule.

19. The context manager of claim 17, wherein the migration manager is further operable to track an age for each entry in the queues and to service each of the queues based on the age for each of the entries.

20. The context manager of claim 19, wherein the age for each of the entries identifies a time when a packet corresponding to the entry was received by the system.

21. The context manager of claim 17, wherein prior to placing the migration data into the queue associated with the target code partition, the migration manager is further operable to determine that the queue associated with the target code partition is empty and, in response, to bypass the queue by communicating the packet context information to the available one of the processors.

22. The context manager of claim 17, wherein the packet context information comprises a stack pointer that indicates a location in a shared memory resource that is coupled to and accessible by each of the processors.

23. The context manager of claim 17, wherein the migration manager is further operable to detect unbalanced operation that delays processing due to a selected one of the code partitions and to reassign the code partitions such that the selected one of the code partitions is assigned to an increased number of the processors after the reassignment.

24. A method for handling migration of packet processing, the method comprising:

providing a system comprising a plurality of processors and a shared memory maintaining a plurality of code partitions, wherein the code partitions together implement a feature set for packet processing and wherein each of the code partitions is assigned as unloaded or is assigned to at least one of the processors;

receiving a migration request from a selected one of the processors, the migration request comprising packet context information and identifying a target one of the code partitions;

in response to the migration request, identifying an available one of the processors having the target code partition assigned;

communicating the packet context information to the available one of the processors;

maintaining a plurality of queues each corresponding to one of the code partitions;

in response to the migration request, placing migration data comprising the packet context information into the queue associated with the target code partition;

monitoring the queue associated with the target code partition;

upon determining that one of the processors having the target code partition assigned is available for processing, communicating the packet context information to the available one of the processors;

wherein an initial one of the code partitions includes instructions for initial packet processing that identify a plurality of processing functions and, for each of the processing functions, include a migration instruction associated with the processing function that indicates another one of the code partitions; and wherein a selected one of the processors assigned the initial code partition is operable to receive packet context information associated with a received packet, the selected processor further operable, by executing the initial code partition, to identify characteristics of the received packet that correspond to one of the processing functions, to select the migration instruction associated with the identified processing function, and to generate a migration request that comprises the received packet context information and targets the other one of the code partitions indicated by the selected migration instruction.

25. The method of claim 24, further comprising servicing each of the queues using a first in first out servicing schedule.

26. The method of claim 24, further comprising:

tracking an age for each entry in each of the queues; and servicing each of the queues based on the age for each of the entries.

27. The method of claim 24, further comprising, prior to placing the migration data into the queue associated with the target code partition, determining that the queue associated with the target code partition is empty and, in response, bypassing the queue by communicating the packet context information to the available one of the processors.

28. The method of claim 24, wherein the packet context comprises a stack pointer that indicates a location in a shared memory resource that is coupled to and accessible by each of the processors.

29. The method of claim 24, further comprising:
  detecting unbalanced operation that delays processing due to a selected one of the code partitions;
  determining assignments of the code partitions among the processors; and reassigning the code partitions such that the selected one of the code partitions is
  assigned to an increased number of the processors after the reassignment.

30. The method of claim 24, further comprising receiving a migration request targeting one of the code partitions assigned as unloaded and, in response, loading the targeted one of the code partitions into the instruction memory of at least one of the processors.

31. A computer-readable medium comprising logic for handling migration of packet processing, the logic operable when executed to perform the steps of:
  detecting a system comprising a plurality of processors and a shared memory maintaining a plurality of code partitions, wherein the code partitions together implement a feature set for packet processing and wherein each of the code partitions is assigned as unloaded or is assigned to at least one of the processors;
  receiving a migration request from a selected one of the processors, the migration request comprising packet context information and identifying a target one of the code partitions;
  in response to the migration request, identifying an available one of the processors having the target code partition assigned;
  communicating the packet context information to the available one of the processors;
  maintaining a plurality of queues each corresponding to one of the code partitions;
  in response to the migration request, placing migration data comprising the packet context information into the queue associated with the target code partition;
  monitoring the queue associated with the target code partition;
  upon determining that one of the processors having the target code assigned is available for processing, communicating the packet context information to the available one of the processors;
  wherein an initial one of the code partitions includes instructions for initial packet processing that identify a plurality of processing functions and, for each of the processing functions, include a migration instruction associated with the processing function that indicates another one of the code partitions; and
  wherein a selected one of the processors assigned the initial code partition is operable to receive packet context information associated with a received packet, the selected processor further operable, by executing the initial code partition, to identify characteristics of the received packet that correspond to one of the processing functions, to select the migration instruction associated with the identified processing function, and to generate a migration request that comprises the received packet context information and targets the other one of the code partitions indicated by the selected migration instruction.

32. The computer-readable medium of claim 31, further operable to service each of the queues using a first in first out servicing schedule.

33. The computer-readable medium of claim 31, further operable when executed to perform the steps of: tracking an age for each entry in each of the queues; and servicing each of the queues based on the age for each of the entries.

34. The computer-readable medium of claim 31, further operable when executed to perform the steps of, prior to placing the migration data into the queue associated with the target code partition, determining that the queue associated with the target code partition is empty and, in response, bypassing the queue by communicating the packet context information to the available one of the processors.

35. The computer-readable medium of claim 31, wherein the packet context comprises a stack pointer that indicates a location in a shared memory resource that is coupled to and accessible by each of the processors.

36. The computer-readable medium of claim 31, further operable when executed to perform the steps of: detecting unbalanced operation that delays processing due to a selected one of the
  code partitions; determining assignments of the code partitions among the processors; and reassigning the code partitions such that the selected one of the code partitions is
  assigned to an increased number of the processors after the reassignment.

37. The computer-readable medium of claim 31, further operable to be executed on a selected one of the processors.

38. A system for packet processing, the system comprising:
memory means for maintaining a plurality of code partitions, the code partitions together implementing a feature set for packet processing;
  a plurality of processing means each operable to access the memory means, to be loaded with one of the code partitions from the memory means, to execute the loaded code partition to perform processing of packets, and to generate migration requests for transferring packet processing operations from the loaded code partition; and
  a context management means operable to receive a migration request from one of the loaded code partitions, the migration request including a packet context and identifying a target one of the code partitions, the context management means further operable, in response to the migration request, to identify an available one of the processing means having the target code partition loaded, and to communicate the packet context to the available one of the processing means;
  wherein the context manager means maintains a plurality of queues each corresponding to one of the code partitions, the context manager means further operable, in response to the migration request, to place migration data comprising the packet context information into the queue associated with the target code partition, to monitor the queue associated with the target code partition, and upon determining that one of the processing means having the target code partition loaded is available for processing, to communicate the packet context information to the available one of the processing means;
  wherein an initial one of the code partitions includes instructions for initial packet processing that identify a plurality of processing functions and, for each of the processing functions, include a migration instruction associated with the processing function that indicates another one of the code partitions; and wherein a selected one of the processors assigned the initial code partition is operable to receive packet context information associated with a received packet, the selected processor further operable, by executing the initial code partition, to identify characteristics of the received packet that correspond to one of the processing functions, to select the migration instruction associated with the identified processing function, and to generate a migration request that comprises the received packet context information and targets the other one of the code partitions indicated by the selected migration instruction.

* * * * *

UNITED STATES PATENT AND TRADEMARK OFFICE
CERTIFICATE OF CORRECTION

PATENT NO. : 7,664,823 B1
APPLICATION NO. : 10/669624
DATED : February 16, 2010
INVENTOR(S) : John F. Wakerly It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1908 days.

Signed and Sealed this

Seventh Day of December, 2010

David J. Kappos
*Director of the United States Patent and Trademark Office*